United States Patent
Charters et al.

(10) Patent No.: US 9,652,205 B2
(45) Date of Patent: May 16, 2017

(54) METHOD, SYSTEM AND COMPUTER PROGRAM FOR BYTECODE WEAVING

(75) Inventors: Graham C. Charters, Southampton (GB); Mark P. Nuttall, Winchester (GB); Timothy J. Ward, Winchester (GB)

(73) Assignee: International Business Machines Corporation, Armonk, NY (US)

(*) Notice: Subject to any disclaimer, the term of this patent is extended or adjusted under 35 U.S.C. 154(b) by 1934 days.

(21) Appl. No.: 12/953,864

(22) Filed: Nov. 24, 2010

(65) Prior Publication Data

US 2011/0126177 A1 May 26, 2011

(30) Foreign Application Priority Data

Nov. 25, 2009 (EP) .................................. 09177088

(51) Int. Cl.
| | | |
|---|---|---|
| *G06F 9/45* | (2006.01) | |
| *G06F 9/44* | (2006.01) | |
| *G06F 9/445* | (2006.01) | |

(52) U.S. Cl.
CPC .................. *G06F 8/40* (2013.01); *G06F 8/44* (2013.01); *G06F 8/76* (2013.01); *G06F 9/44521* (2013.01)

(58) Field of Classification Search
None
See application file for complete search history.

(56) References Cited

PUBLICATIONS

Keuler et al, "A light-weight load-time weaving approach for OSGI", Apr. 2008, ACM.*
Irmert et al, "Towards Runtime Adaptation in a SOA Environment", 2007, 4th ECOOP Workshop on Reflection.*

* cited by examiner

*Primary Examiner* — Lewis A Bullock, Jr.
*Assistant Examiner* — Mark Gooray
(74) *Attorney, Agent, or Firm* — Steven M. Greenberg, Esq.; CRGO Law

(57) ABSTRACT

A method, computer apparatus and computer program product for bytecode weaving is described herein. The method includes determining when a code module such as an OSGi bundle that requires bytecode weaving becomes available for loading into a system. Code associated with the code module is loaded. This code may be part of the module itself or part of a separate entity, such as an OSGI bundle fragment, but does not require weaving. Responsive to loading the code associated with the code module, a reference is received to the entity responsible for loading the code associated with the code module. A code entity (which does require weaving) within the code module is identified and a woven set of bytes are provided to the code loading entity identified via the returned reference. Consequently, the woven set of bytes represents a transformed version of the identified code entity.

27 Claims, 3 Drawing Sheets

METHOD, SYSTEM AND COMPUTER PROGRAM FOR BYTECODE WEAVING

CROSS-REFERENCE TO RELATED APPLICATIONS

This application claims priority under 35 U.S.C. §119(a) to European Patent Application Serial Number 09177088.3, filed Nov. 25, 2009, entitled "A METHOD, SYSTEM AND COMPUTER PROGRAM FOR BYTE CODE WEAVING", the entirety of which is incorporated herein by reference.

FIELD OF THE INVENTION

The invention relates to bytecode weaving and more particularly to load time bytecode weaving.

BACKGROUND OF THE INVENTION

Bytecode weaving is the process of transforming a class file conformant to the Java programming language and transforming the class file into something potentially more complicated. Typical uses of bytecode weaving include adding code to address some cross-cutting concern, for example to add method-level logging to a set of classes, or to initiate and complete global transactions around methods that write to a database. Bytecode weaving can take place at compile time, at package deployment time or at load time. (Java and all Java-based trademarks and logos are trademarks of Sun Microsystems, Inc. in the United States, other countries, or both.)

Load time bytecode weaving is generally perceived as the most flexible. It allows generic code to be created that will run on a variety of platforms. Such generic code can then be woven at the last possible moment in order to make it appropriate to, for example, a particular platform.

In order to perform bytecode weaving at class load time, it is necessary to intercept the class bytecode and modify it before it is first loaded into the runtime system. This is however not easily achievable in all environments.

The OSGi Alliance (formerly known as the Open Services Gateway Initiative) is a standards organisation which has defined a framework for remotely managing the modularity and integration of Java applications. The OSGi environment is an example of an environment in which it is not easily possible to obtain access to code before it is loaded at runtime.

The concept of an OSGi application is not standardised, but commercially available products have defined an application as a collection of OSGi bundles (code modules). The concept of a bundle is standardised in OSGi and bundles may specify dependencies on other bundles, packages or services.

Each OSGi bundle has its own class loader which is responsible for loading and defining the classes contained inside the bundle into the runtime. In order to weave a class at load time it is necessary to gain access to the class loader for the bundle that will load that class and modify its behaviour. The difficulty with the OSGi environment is that the class loader is intentionally hidden and not easily accessible.

One example of where this is particularly problematic is in relation to the Java Persistence application programming interface (API) also known as "JPA". The JPA is an object relational mapping specification that allows client code to transparently persist Java Objects to a Relational Database and retrieve them at a later time. The JPA specifies a number of performance optimisations which are designed to reduce the amount of data that should be retrieved from the database. This is particularly noticeable when one JPA entity (the name for objects that can be persisted by JPA) references one or more other entities.

In order to support this type of optimization without requiring complex configuration or coding by clients, JPA specifies an integration point for the use of bytecode weaving. This strategy allows a JPA provider to rewrite the bytecode of an entity class so that internal state can be lazily loaded on a "just in time" basis.

In order to perform bytecode weaving, the JPA provider provides a container implementer with a ClassTransformer. This can be used by the container to transform the bytecode before it is loaded by the application's ClassLoader. In JEE this is a relatively simple task, as the JEE Application Server has complete control over the Application ClassLoader. In other environments, such as OSGi, the ClassLoader is not controlled by the container, and is not easily available to the runtime. At this point it is very difficult for the container to weave any classes at load time.

One existing solution to this problem is to use a Java Agent. These Java Agents allow container code to interpose in the class loading process, and to force class redefinition after a class has been loaded. Unfortunately, Java agents can severely impact the performance of a Java virtual machine (JVM), as they are invoked during the loading of every single class. Further to this, Java agents can expose serious security risks, as they can be used to redefine any class in the runtime, including parts of the container.

This problem is not however limited to the scope of JPA, but applies generally to the case where a container needs to apply known, or dynamically generated aspects to an application class at class load time in an OSGi framework.

One implementation of the OSGi environment, known as "Equinox" and provided by the Eclipse Foundation, has provided a workaround for the problem described above. The Equinox implementation specifies an exit point called a ClassLoadingHook which provides a mechanism to replace an original set of bytes with a new, transformed (or bytecode woven) set of bytes. This is described in Thorsten Keuler and Yury Kornev, *A light-weight load-time weaving approach for OSGi*, in NAOMI '08 Proceedings of the 2008 workshop on Next generation aspect oriented middleware (2008).

The solution described in the aforementioned document is however very specific to the Equinox OSGi environment, rather than being more generally applicable.

SUMMARY OF THE INVENTION

According to a first aspect, there is provided a method for bytecode weaving comprising: determining when a code module that requires bytecode weaving becomes available for loading into a system; loading code associated with the code module, said code having been identified as not requiring weaving; responsive to loading said code associated with the code module, receiving a reference to the entity responsible for loading the code associated with the code module; identifying a code entity within the code module, wherein the code entity requires weaving; and providing a woven set of bytes to the code loading entity identified via the returned reference, wherein the woven set of bytes represents a transformed version of the identified code entity.

The code associated with the code module could simply by a dummy class which may be entirely empty.

The woven set of bytes is preferably loaded using the code loading entity.

The code identified as not requiring weaving may be code that exists within the code module itself. In a preferred embodiment however, an enhancing entity is generated which comprises code identified as not requiring weaving. This enhancing entity is then associated with the code module.

Code weaving dependencies are preferably added to the enhancing entity and the step of loading code associated with the code module preferably comprises loading code within the enhancing entity.

A code entity that requires weaving (e.g. a class) is preferably selected from a plurality of code entities that require weaving. In one embodiment code entities requiring weaving are selected according to a predefined order.

In a preferred embodiment, the bytes representing the code entity that requires weaving are loaded and transformed into the woven set of bytes.

In a preferred embodiment, it is determined when a code module that requires bytecode weaving becomes available for loading into a system by using a listener to detect when the code module resolves any dependencies specified by the code module.

According to a second aspect, there is provided an apparatus for bytecode weaving comprising: a component for determining when a code module that requires bytecode weaving becomes available for loading into a system; a component for loading code associated with the code module, said code having been identified as not requiring weaving; a component, responsive to loading said code associated with the code module, for receiving a reference to the entity responsible for loading the code associated with the code module; a component for identifying a code entity within the code module, wherein the code entity requires weaving; and a component for providing a woven set of bytes to the code loading entity identified via the returned reference, wherein the woven set of bytes represents a transformed version of the identified code entity.

According to a third aspect, there is provided a computer program comprising program code means adapted to perform a method for bytecode weaving, when said program is executed on a computer, the method comprising: determining when a code module that requires bytecode weaving becomes available for loading into a system; loading code associated with the code module, said code having been identified as not requiring weaving;

responsive to loading said code associated with the code module, receiving a reference to the entity responsible for loading the code associated with the code module; identifying a code entity within the code module, wherein the code entity requires weaving; and providing a woven set of bytes to the code loading entity identified via the returned reference, wherein the woven set of bytes represents a transformed version of the identified code entity.

BRIEF DESCRIPTION OF THE DRAWINGS

A preferred embodiment of the present invention will now be described, by way of example only, and with reference to the following drawings.

DETAILED DESCRIPTION

Figure 1:
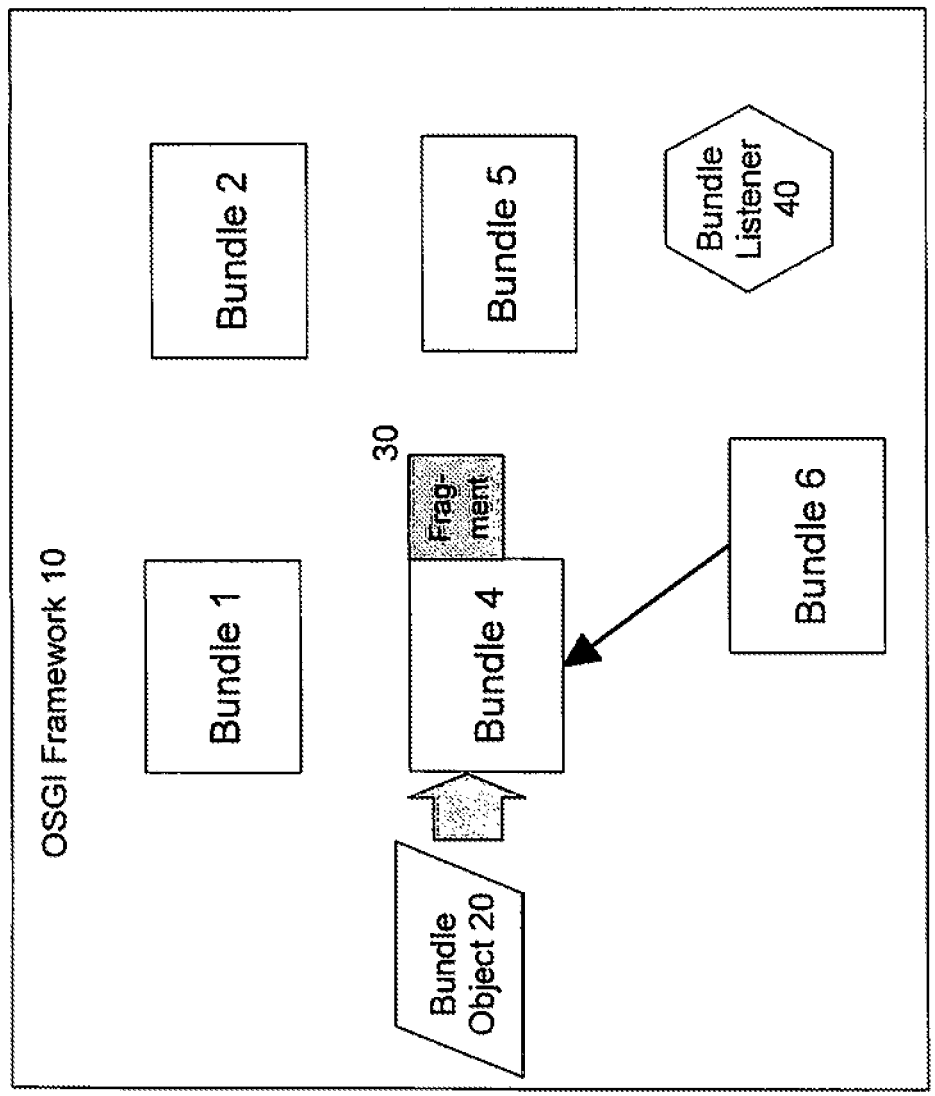
FIG. 1 illustrates an OSGi environment in which a preferred embodiment of the present invention is operable.
Figure 2:
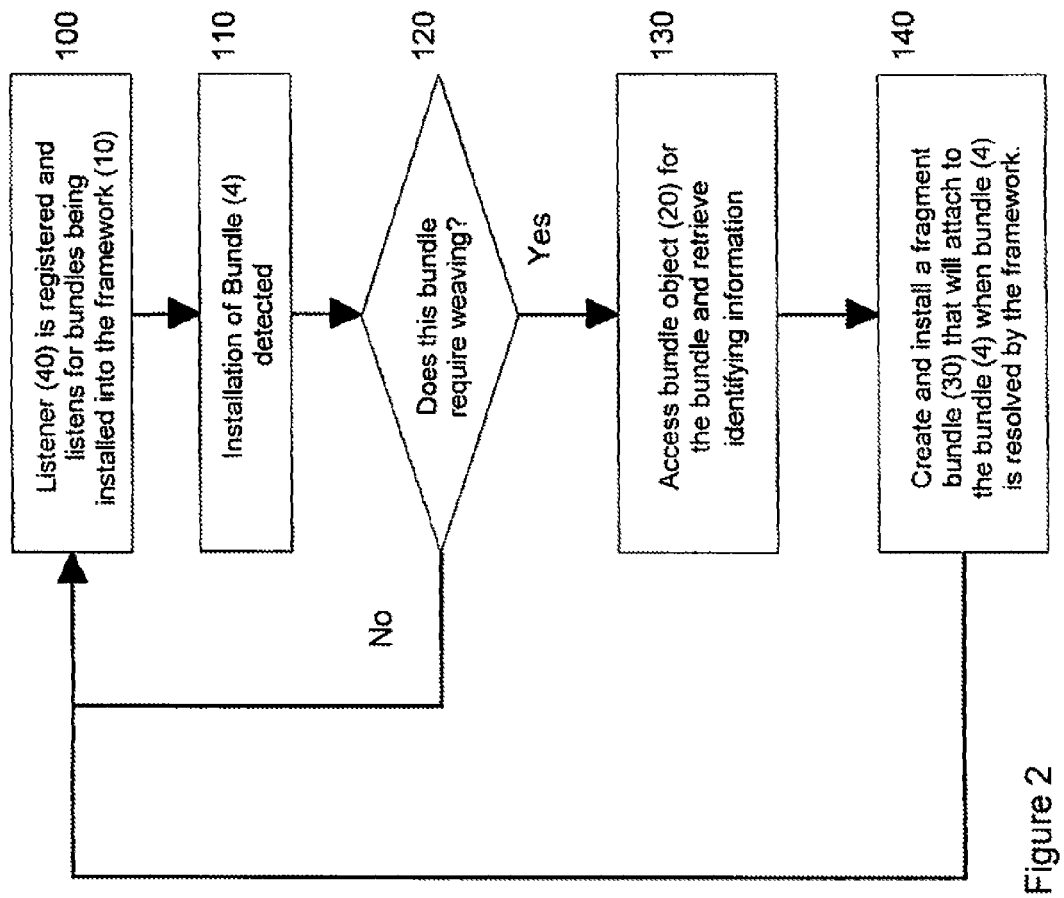
FIGS. 2 and 3 are flowcharts of the processing of the present invention in accordance with a preferred embodiment.
Figure 3:
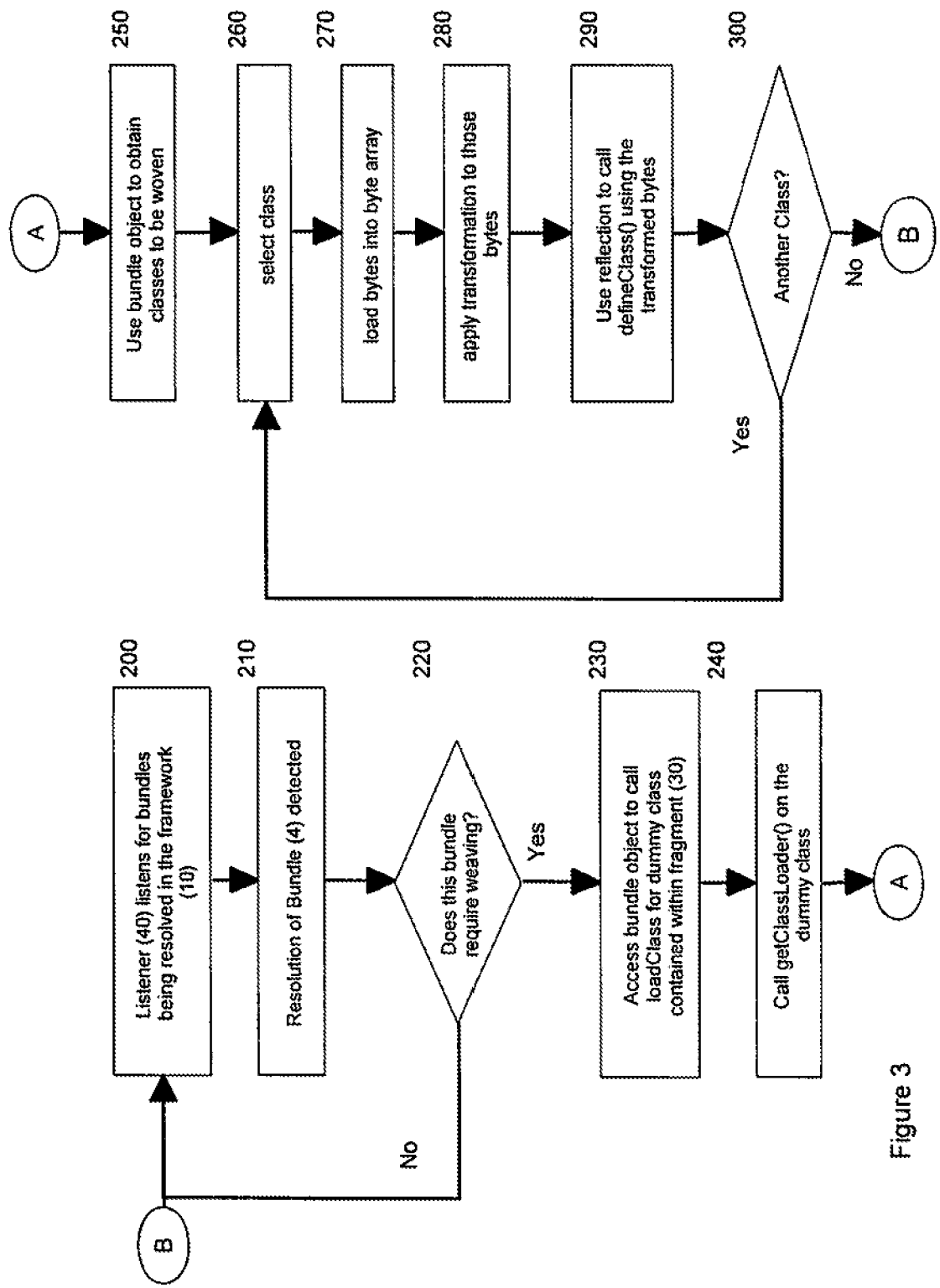

FIG. 1 illustrates an OSGi environment in which the present invention is operable in accordance with a preferred embodiment. This figure should be read in conjunction with FIGS. 2 and 3 which describe the actual processing that takes place.

OSGi framework 10 comprises a number of bundles (code modules) 1, 2, 4, 5 and 6, with a set of bundles typically making up an application. As discussed previously, it is sometimes desirable to transform the classes in a bundle at load time via the process of bytecode weaving.

A SynchronousBundleListener (bundle listener 40) is registered with the OSGi framework by bundle 6 to detect installation events (step 100). Bundle listener 40 therefore determines when a bundle is being installed (e.g. bundle 4) within the framework 10 (step 110).

The listener then determines whether the bundle will require bytecode weaving at step 120. If no weaving is required then the process loops round to detect the next time a bundle is installed.

In this instance weaving is required, as bundle 6 has been configured to add method entry and exit trace calls to all classes in the package org.acme.my.application, and bundle 4 contains classes in that package. It should be noted that this is merely one example of when weaving might be required. The details of the mechanism for determining whether a bundle needs to be woven are not essential to the preferred embodiment and so will not be discussed herein in any detail.

As a result, a bundle to be woven is detected at step 120. Bundle 6 wants to weave bundle 4. Bundle 4 need not realise that it needs to be woven, or, if bundle 4 is aware that it needs to be woven, bundle 4 need not know which bundle will be responsible for doing the weaving.

(Note, although bundle 4 is shown in FIG. 1, bundle 4 has not yet been resolved (the process of resolving is described later) within framework 10. As a result it is not available to supply dependencies or load classes)

Each bundle in the framework has a bundle object 20 associated with it. The bundle object represents the physical bundle in the runtime. It includes metadata about its associated bundle and also includes methods that can be used to interact with the bundle.

At step 130, the bundle object is accessed for the bundle being installed. The bundle object can be used to determine the bundle's identifier and other metadata. This information is useful when determining whether the bundle needs to be modified. As previously described, bytecode weaving can substantially modify a class. This can include adding external dependencies. In OSGi this can be problematic, as a bundle must express any dependencies on code from other modules in its metadata prior to being resolved.

The metadata collected in step 130 can be used to determine whether any additional external dependencies (i.e. over and above those specified in the original metadata) will be added to bundle 4 by the weaving process.

At step 140, in accordance with a preferred embodiment, bundle 6 uses the metadata from step 130 to create a bundle fragment that can attach to bundle 4. Typically this bundle fragment will be created dynamically, but in the case where the bundles to be woven are known in advance, these fragments may exist statically. A bundle fragment is an OSGi concept typically comprising code and metadata.

Additional content is added to the bundle metadata using bundle fragment headers. These headers ensure that bundle 4 can load the additional code dependencies that will be added by the weaving process.

Alternatively, each bundle has an associated manifest which describes the bundle and its external dependencies. If the bundle can be intercepted before it is installed into the framework then this manifest can be rewritten to ensure that the additional code dependencies can be loaded. This solution is more complicated; it either requires that bundle 6 has non-standard access to the internals of the framework, or that any bundles to be woven are modified before they are installed into the framework. This pre-modification essentially performs deployment-time weaving, and removes the many advantages of load-time weaving.

The new fragment preferably also contains a dummy class. This class may be (but does not have to be) entirely empty. The presence of this dummy class ensures that bundle 6 has access to a known class in bundle 4 that can be loaded without causing any of the classes that need to be woven to be loaded.

A fragment may be generated dynamically using standard classes in the Java API. The fragment metadata; including the intended host bundle and any additional dependencies is added to a java.util.jar.Manifest. This Manifest can then be written to a java.util.jar.JarOutputStream. This JarOutputStream may output data to a file on disk, an in-memory byte array, or some other storage using the standard Java chaining mechanism for streams. In addition to the Manifest, bundle 6 may wish to add another entry containing a Java class file (the dummy or other classes). This can be achieved by calling putNextEntry( ) and writing out the bytes of the class file to be added. Once the fragment has been generated, either as a byte array, a file, or in some other form, one of the standard Java input classes may be used to obtain a java.io.InputStream that can load the fragment. Examples include java.io.ByteArrayInputStream or java.io.FileInputStream. The resulting InputStream can then be given to the framework to install.

Once the bundle fragment from step 140 has been installed into the framework, the listener has finished processing the installation event. The listener then returns to step 100, until another bundle is installed.

At some time later the OSGi framework will attempt to resolve bundle 4. In step 200 bundle 6 registers to listen for these events, either using a second BundleListener, or using the same BundleListener 40 that was registered in step 100. For simplicity, it is assumed that the same BundleListener is used, however use of a separate listener is equally appropriate.

The fragment to the identified bundle, installed at step 140, will be attached when the bundle is resolved within the framework. As previously specified a bundle may specify dependencies on other bundles; that is to say, a bundle may import or export packages, services or other bundles. Resolution takes place when a bundle is appropriately wired to other components (packages, bundles) within the framework via such imports and/or exports.

In step 210 the listener (40) is notified that a bundle has resolved. The listener performs a simple check (step 220) to see if that bundle needs to be woven. As any bundles that need to be woven have already been identified (in step 120), it is simple to check whether the resolved bundle needs further processing. If the bundle does not require weaving, then the listener returns to step 200 and waits to be notified of another bundle resolving. In the case where a bundle does need to be woven the system proceeds to step 230.

A fragment is used by the preferred embodiment to obtain access to the hidden class loader. The way in which this is achieved will be described below. It should however be appreciated that the use of a fragment containing a dummy class is not essential. The key point here is that reference to the class loader should be obtained by loading a class inside bundle 4 which is definitely not going to be woven by bundle 6. This is not something that can necessarily be easily discovered and thus an effective way forward is to use a fragment containing a dummy class.

At step 230, the bundle object is accessed again in order to call loadClass on the dummy class within the bundle fragment 30. Calling loadClass returns an instance of java.lang.Class which contains a public method getClassLoader( ) getClassLoader( ) is called at step 240 and this returns a reference to the previously hidden class loader responsible for loading classes contained within bundle 4.

It should be appreciated that java.lang.Class is part of core Java and the other methods mentioned are well known and will not be discussed in any more detail herein.

At step 250, the bundle object is used to obtain the classes that are to be woven. Various known public methods may be specified by the bundle object as mechanisms for retrieving the relevant classes. One such method is getResource. This method is called, whilst specifying the name of the resource to return. A URL is then returned which provides access to the resource and it is possible to open a stream to that URL in order to retrieve a set of bytes. findEntries is another example of a public and known method which may be used to return a list of the class resources within a bundle. This is useful when precise classes are not yet known, for example, when bundle 6 wishes to weave every class in the org.acme.my.application package. Alternatively the ClassLoader (using the reference returned at step 240) itself could be used to find the class definitions and read their content.

It should also be appreciated that while the process describes accessing the bundle object multiple times, this is not necessarily done. Information from the bundle object may instead be cached upon first access.

At step 260, a class to be woven is selected. This selection step is important, and should ensure that the classes are processed in an order that will not cause classes that have yet to be woven to be loaded. A simple algorithm to apply in this case is as follows. Separate the classes to be woven into two groups, one group containing interface classes and one containing implementation classes. Start with the group of interface classes, and process the classes in hierarchy order (i.e. process the most general super-interface first). Once all of the interfaces have been processed then perform the same selection with the group of implementation classes. If either of the groups contain two or more unrelated classes (classes that do not share a direct inheritance hierarchy) then these classes may be processed in any order. It should be noted that this algorithm is only an example, any other algorithm that produces a suitable result may be used.

The bytes representing the selected class are loaded into a byte array (step 270) and the desired transformation is applied to those bytes at step 280. The transformation (byte code weaving) can be achieved via the java.lang.instrument package which contains the ClassFileTransormer interface. Again java.lang.instrument and the ClassFileTransformer interface are well known and are part of core Java.

Having transformed the bytes, reflection is used at step 290 to call the defineClass( ) method on the bundle ClassLoader, passing in the transformed bytes. The reference returned at step 240 is used to access the ClassLoader. The defineClass( )method is the method that the ClassLoader calls in order to instantiate a runtime version of the Class within a Java Virtual Machine.

This mechanism modifies the operation of the Class-Loader by calling defineClass with the transformed bytes rather than with the original (non-transformed) bytes that would otherwise be used.

It should be appreciated that defineClass can only be called once per class because subsequently the bytes are cached for retrieval. It is therefore important to use bundle listener 40 to listen on resolve events and to eagerly load all classes that are to be woven.

It is then determined at step 300 whether there is another class to weave and if so, the process loops round to step 260, and selects the next class to weave. If not, the process ends and the listener waits for another bundle resolution event (step 200).

As indicated above, on occasion there will be multiple classes to weave. It is important that if these classes are within a hierarchy certain strict ordering is observed. In the standard Java class loading model, there are two requirements:
a) if an interface class is to be woven then it should be woven before any class that implements that interface; and
b) if two or more classes in the same hierarchy are to be processed then the classes should be processed in descending hierarchy order.

It should be appreciated that although the present invention has been described within the context of OSGi, it is not limited to such. Rather the invention is applicable to any environment where the code loading strategy is not readily available to the executing code; for example in one of the other languages designed to run on the Java Virtual Machine. The invention should also not limited to Java.

While the term bytecode weaving may be seen as very Java specific, it is not to be interpreted as such when used herein. The term bytecode should be taken to apply generically to any machine instructions generated by a developer or an automated tool. Weaving is the term used herein for modifying this code.

The invention claimed is:

1. A method for bytecode weaving comprising:
   determining when a code module that requires bytecode weaving becomes available for loading into memory of a computing system;
   loading into the memory code associated with the code module, said code having been identified as not requiring weaving;
   responsive to loading said code associated with the code module, receiving a reference to the entity responsible for loading the code associated with the code module;
   identifying a code entity within the code module, wherein the code entity requires weaving; and
   providing a woven set of bytes to the code loading entity identified via the returned reference, wherein the woven set of bytes represents a transformed version of the identified code entity.

2. The method of claim 1 comprising:
   loading the woven set of bytes using the code loading entity.

3. The method of claim 1, comprising:
   generating an enhancing entity that is a bundle comprising code and metadata; and
   associating the enhancing entity with the code module.

4. The method of claim 3, comprising:
   adding external dependencies to the enhancing entity as part of byte code weaving.

5. The method of claim 3, wherein the step of loading code associated with the code module comprises:
   loading code within the enhancing entity.

6. The method of claim 1, wherein the step of identifying a code entity within the code module, wherein the code entity requires weaving, comprises:
   selecting the code entity from a plurality of code entities that require weaving.

7. The method of claim 6, wherein the selecting step comprises:
   selecting code entities according to a predefined order.

8. The method of claim 1, comprising:
   loading bytes representing the code entity that requires weaving; and
   transforming the bytes into the woven set of bytes used during the providing step.

9. The method of claim 1, wherein the step of determining when a code module that requires bytecode weaving becomes available for loading into a system comprises:
   using a listener to detect when the code module resolves any dependencies specified by the code module.

10. A computing apparatus for bytecode weaving comprising:
    a computer system with at least one processor and memory;
    a component for determining when a code module that requires bytecode weaving becomes available for loading into a system;
    a component for loading code associated with the code module, said code having been identified as not requiring weaving;
    a component, responsive to loading said code associated with the code module, for receiving a reference to the entity responsible for loading the code associated with the code module;
    a component for identifying a code entity within the code module, wherein the code entity requires weaving; and
    a component for providing a woven set of bytes to the code loading entity identified via the returned reference, wherein the woven set of bytes represents a transformed version of the identified code entity,
    each of the components comprising executable program code configured for execution in the memory of the computer system.

11. The apparatus of claim 10 comprising:
    a component for loading the woven set of bytes using the code loading entity.

12. The apparatus of claim 10, comprising:
    a component for generating an enhancing entity that is a bundle comprising code and metadata; and
    a component for associating the enhancing entity with the code module.

13. The apparatus of claim 12, comprising:
    a component for adding external dependencies to the enhancing entity as part of byte code weaving.

14. The apparatus of claim 12, wherein the component for loading code associated with the code module comprises:
    a component for loading code within the enhancing entity.

15. The apparatus of claim 10, wherein the component for identifying a code entity within the code module, wherein the code entity requires weaving, comprises:
    a component for selecting the code entity from a plurality of code entities that require weaving.

16. The apparatus of claim 15, wherein the component for selecting comprises:
    a component for selecting code entities according to a predefined order.

17. The apparatus of claim 10, comprising:
    a component for loading bytes representing the code entity that requires weaving; and a component for transforming the bytes into the woven set of bytes used by the providing component.

18. The apparatus of claim 10, wherein the component for determining when a code module that requires bytecode weaving becomes available for loading into a system comprises:
a component for using a listener to detect when the code module resolves any dependencies specified by the code module.

19. A computer program product for bytecode weaving, the computer program product comprising:
a non-transitory computer readable storage medium having computer readable program code embodied therewith, the computer readable program code comprising:
computer readable program code for determining when a code module that requires bytecode weaving becomes available for loading into a system;
computer readable program code for loading code associated with the code module, said code having been identified as not requiring weaving;
computer readable program code responsive to loading said code associated with the code module, for receiving a reference to the entity responsible for loading the code associated with the code module;
computer readable program code for identifying a code entity within the code module, wherein the code entity requires weaving; and
computer readable program code for providing a woven set of bytes to the code loading entity identified via the returned reference, wherein the woven set of bytes represents a transformed version of the identified code entity.

20. The computer program product of claim 19, further comprising:
computer readable program code for loading the woven set of bytes using the code loading entity.

21. The computer program product of claim 19, further comprising:
computer readable program code for generating an enhancing entity that is a bundle comprising code and metadata; and
computer readable program code for associating the enhancing entity with the code module.

22. The computer program product of claim 21, further comprising:
computer readable program code for adding external dependencies to the enhancing entity as part of byte code weaving.

23. The computer program product of claim 21, wherein the computer readable program code for loading code associated with the code module comprises:
computer readable program code for loading code within the enhancing entity.

24. The computer program product of claim 19, wherein the computer readable program code for identifying a code entity within the code module, wherein the code entity requires weaving, comprises:
computer readable program code for selecting the code entity from a plurality of code entities that require weaving.

25. The computer program product of claim 24, wherein the computer readable program code for selecting comprises:
computer readable program code for selecting code entities according to a predefined order.

26. The computer program product of claim 19, wherein further comprising:
computer readable program code for loading bytes representing the code entity that requires weaving; and
computer readable program code for transforming the bytes into the woven set of bytes used during the providing step.

27. The computer program product of claim 19, wherein the computer readable program code for determining when a code module that requires bytecode weaving becomes available for loading into a system comprises:
computer readable program code for using a listener to detect when the code module resolves any dependencies specified by the code module.

* * * * *